(No Model.)
J. M. SPANGLER.
GRAIN HARVESTER.
No. 356,171. Patented Jan. 18, 1887.
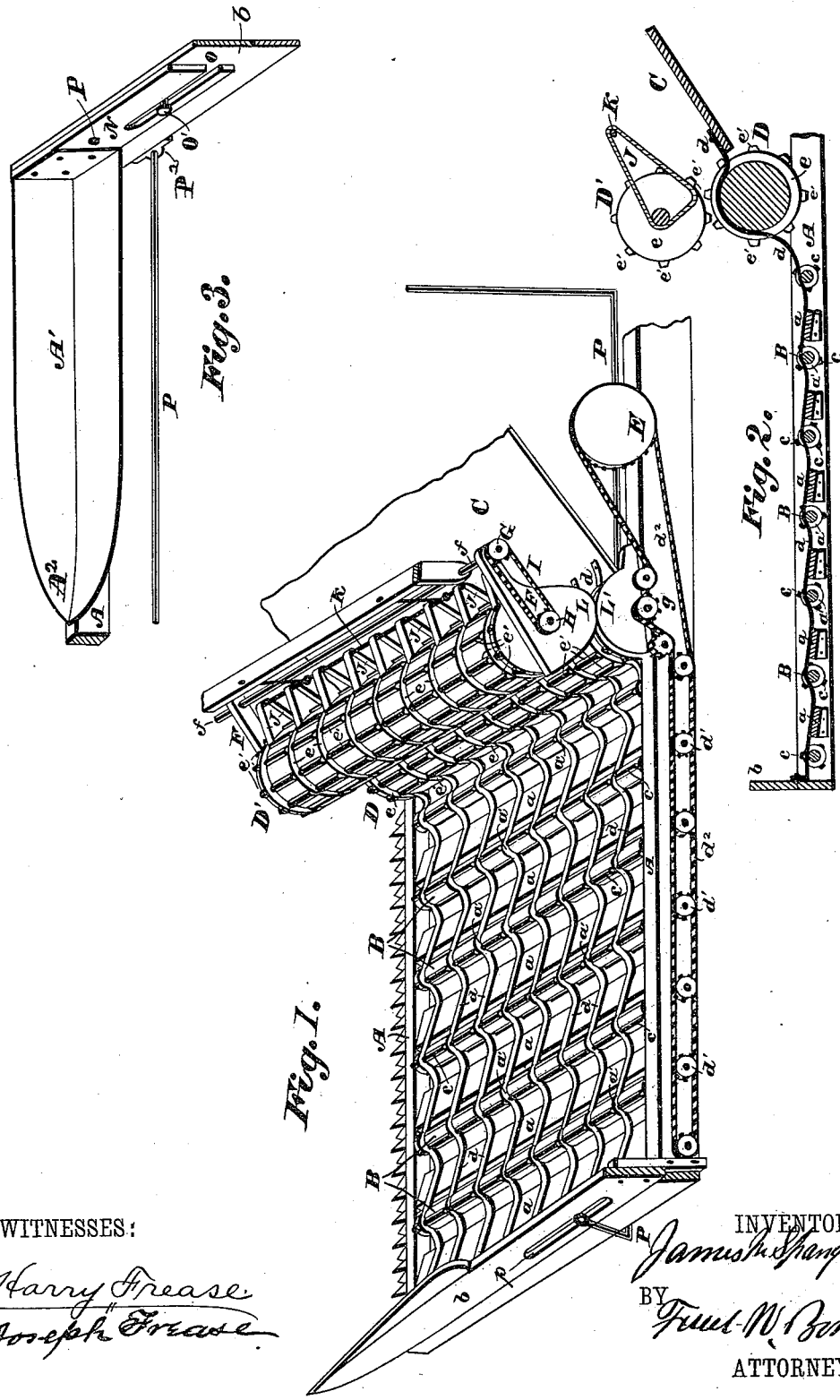
WITNESSES:
Harry Frease
Joseph Frease
INVENTOR
James M. Spangler
BY
Fred W. Bond
ATTORNEY

UNITED STATES PATENT OFFICE.

JAMES MURRAY SPANGLER, OF CANTON, OHIO.

GRAIN-HARVESTER.

SPECIFICATION forming part of Letters Patent No. 356,171, dated January 18, 1887.

Application filed August 10, 1885. Serial No. 173,959. (No model.)

*To all whom it may concern:*

Be it known that I, JAMES MURRAY SPANGLER, a citizen of the United States, residing at Canton, in the county of Stark and State of Ohio, have invented certain new and useful Improvements in Grain-Harvesters; and I do hereby declare that the following is a full, clear, and exact description of the same, reference being had to the annexed drawings, making a part of this specification, and to the letters and figures of reference marked thereon, in which—

Figure 1 is a perspective view of a part of a harvester, showing my improvement, the tail-board being removed. Fig. 2 is a sectional view. Fig. 3 is a detached view of a part of the dividing-board, showing also the tail-board.

The present invention has relation to self-raking harvesters, whether grain-binders or not; and its nature consists in the different parts and combination of parts hereinafter described, and particularly pointed out in the claims.

Similar letters of reference indicate corresponding parts in all the figures of the drawings.

In the accompanying drawings, A represents the platform-frame, which consists of two or more longitudinal pieces or bars and a suitable number of cross pieces or bars properly framed together in any well-known manner. To the side bars or pieces of the platform-frame are properly journaled the rollers B, which are located and arranged substantially as shown in the drawings.

In the drawings seven rollers are shown, but more or less may be used, as desired, reference being had to the length of the platform and also the distance said rollers are placed apart. Between the rollers B are located the inclined boards or supports $a$, which are for the purpose hereinafter described.

The rollers B are each provided with grooves $a'$, said grooves being so arranged that they will be in line, as shown in Fig. 1, and are for the purpose of relieving the straps or bars $d$, as shown in the drawings. In the drawings eight straps or bars are shown, but more or less may be used, if desired, reference being had to the width of the platform and also the distance said straps or bars $d$ are placed apart, the number of the grooves $a'$ corresponding with the number of the straps or bars used.

For the purpose of preventing the straw or grain from sagging down between the straps or bars $d$ and the rollers B the boards or supports $a$ are placed in the position shown in the drawings, and for the purpose of having the grain or straw move forward said boards or supports are inclined, as shown in the drawings.

The rollers B are provided with the cleats $c$, which are attached to said rollers in any well-known manner, and are arranged on said rollers, substantially as shown in the drawings, and are for the purpose of moving or conveying the grain or straw forward toward the binding-platform. For the purpose of preventing the straw or grain from wrapping around the rollers B the rear edges of the inclined supports $a$ are brought as close to the rollers B as will permit said rollers to revolve without interfering with said supports $a$.

The straps or bars $d$ are securely attached at one end to the platform C, which may be a binder-table or an elevator-chute, as shown in Fig. 1, and for the purpose of preventing the straw or grain from wrapping around the elevating-roller D said straps or bars $d$ extend a short distance beyond said elevating-roller D, as shown, the opposite ends of the straps or bars $d$ being attached to the dividing-board $b$, or a suitable cross-piece provided for the purpose of attaching said straps or bars $d$. These straps or bars $d$ are bent or curved so as to conform to the inclined boards or supports $a$, so as not to interfere with the movements of the grain or straw.

To one end of the shafts of the rollers B are securely attached the sprocket-wheels $d'$, which are for the purpose of communicating motion to said rollers B by means of the drive-chain $d^2$, which receives its motion from the sprocket-wheel E. It will be seen that there are many other kinds and styles of gear that may be employed to communicate rotary motion to the rollers B; but I prefer to operate said rollers as shown.

The elevating-rollers D and D' are located substantially as shown in the drawings, and are provided with the grooves $e$ and the cleats $e'$. The grooves $e$ in the roller D are formed deep, so that the straps or bars $d$ may be less bent or curved, and thereby prevent the straw or grain from becoming lodged against the bent or curved portions of the straps or bars $d$.

The roller D' is located over the roller D, substantially as shown in the drawings, and is held in proper position by means of the arms F. Said arms F are provided with suitable bearings for the shaft of said roller D', the arms F being held in proper position by means of the shaft f. To one end of the shaft f is securely attached in the ordinary manner the sprocket-wheel G, and in line with said sprocket-wheel G is attached the sprocket-wheel H on the shaft of the roller D', as shown in the drawings, and motion communicated to the roller D' by means of the drive-chain I.

The object and purpose of attaching the supporting-arms F to the shaft f is to permit the roller D' to move up and down without changing the distance between the sprocket-wheels G and H, thus communicating motion at all times to the roller D' without regard to the amount of straw or grain passing between the elevating-rollers D and D'.

For the purpose of preventing the straw or grain from wrapping around the roller D', the guards J are provided, and, as shown, are located in the grooves e of the roller D'. The tops or upper ends of said guards J are attached to the bar K, as shown in the drawings, and are so attached that they will turn on the bar K as the roller D' moves up and down.

For the purpose of preventing the rollers D and D' from resting against each other, the bottom or under sides of the arms F are provided with the extensions L, which rest on the top of the extensions L', said extensions being so adjusted as to hold the elevating-rollers D and D' the required distance apart when said rollers are running empty. Motion is communicated to the roller D by means of the drive-chain $d^2$ and the sprocket-wheel g.

For the purpose of regulating the width of the platform, I provide the sliding tail-board A', which is made of sheet metal or like material, and is composed of the horizontal and perpendicular portions, as shown in Fig. 3, and is attached to the bar N, substantially as shown in said Fig. 3; and for the purpose of permitting the bar N, together with the tail-board, to move back and forth the slot or groove O is provided, as shown, through which passes the bolt O', said bolt O' being fixed to the dividing-board b and provided with a suitable head for holding the sliding bar N in proper position.

The object and purpose of providing the sliding tail-board A' are to adjust the platform to grain of different length. It will be understood that when the tail-board is placed in proper position it will lie over the rear ends of the rollers B, and is adjusted front and rear by means of the operating-rod P, which extends under the platform, and is properly attached thereto in any suitable manner. One end of the operating-rod P extends sidewise, so as to be operated by the driver, the opposite end being passed through a slot, p, in the dividing-board b, and secured to the sliding bar N, substantially as shown in the drawings. The tail-board A and sliding bar N being connected, as shown, it is obvious that the tail-board will be adjusted forward or back by moving the rod P in the proper directions. This rod P can be supported by a bracket, $P^2$, or otherwise, as desired.

The object and purpose of placing the cleats e' on the elevating-rollers D and D' is to have said cleats elevate the straw or grain, and at the same time force the straw or grain between said rollers.

The board A' has a horizontal leaf, which lies upon the platform, and the ends $A^2$ may be tapered off from the angle and curved outward, as is usual in chutes, to prevent the ends of the straw or grain from striking the edges of the boards.

Having now fully described my invention, what I claim as new, and desire to secure by Letters Patent, is—

1. The combination, with the inclined boards a, of the cleated rollers B, located between the same and having circumferential grooves, and the strips d, substantially as described.

2. The combination, with the inclined boards a, of the cleated rollers B, located between the same and having circumferential grooves, the strips d, and the elevating-rollers D D', having grooves e to receive the strips, and cleats e', substantially as described.

3. The combination, with the inclined boards a, of the cleated rollers B, having circumferential grooves, the strips d, rollers D D', having grooves e and cleats e', and the guard J, substantially as described.

4. The combination, with the rollers D and D', having grooves e and cleats e', of the guards J and bar K, substantially as described.

5. The combination, with the rollers D and D', having grooves e and cleats e', of the arms F F, having extensions L, and the frame having the extension L', the sprockets G and H, guards J, and bar K, substantially as described.

6. The combination, with the inclined boards a, of the cleated rolls B, rolls D D', strips d, guards J, bar K, and means, substantially as described, for rotating the rolls D D', substantially as described.

7. The combination of the dividing-board b, the adjustable tail-board A', tapered at one end and having a horizontal portion, the sliding bar N, carrying said tail-board and provided with slot O, and the guide-pin O', passed through said slot and attached to the dividing-board, substantially as described.

8. The combination of the adjustable tail-board A', the sliding bar N, carrying said tail-board and provided with slot O, the dividing-board b, having slot p, the pin O', attached to the dividing-board, and the rod P, attached to the sliding bar N and working in the slotted dividing-board, substantially as described.

In testimony that I claim the above I have hereunto subscribed my name in the presence of two witnesses.

JAMES MURRAY SPANGLER.

Witnesses:
HARRY FREASE,
FRED W. BOND.